United States Patent
Cancedda et al.

(10) Patent No.: US 7,536,295 B2
(45) Date of Patent: May 19, 2009

(54) MACHINE TRANSLATION USING NON-CONTIGUOUS FRAGMENTS OF TEXT

(75) Inventors: Nicola Cancedda, Grenoble (FR); Bruno Cavestro, Grénoble (FR); Marc Dymetman, Grenoble (FR); Eric Gaussier, Eybens (FR); Cyril Goutte, Bernin (FR); Michel Simard, Gatineau (CA); Kenji Yamada, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 582 days.

(21) Appl. No.: 11/315,043

(22) Filed: Dec. 22, 2005

(65) Prior Publication Data
US 2007/0150257 A1 Jun. 28, 2007

(51) Int. Cl.
G06F 17/28 (2006.01)
(52) U.S. Cl. .................................. 704/4; 704/2; 704/7
(58) Field of Classification Search ........................ None
See application file for complete search history.

(56) References Cited

U.S. PATENT DOCUMENTS

| | | | |
|---|---|---|---|
| 5,140,522 A | 8/1992 | Ito et al. | |
| 5,408,410 A | 4/1995 | Kaji | |
| 5,442,546 A * | 8/1995 | Kaji et al. | 704/4 |
| 5,477,450 A * | 12/1995 | Takeda et al. | 704/2 |
| 5,477,451 A | 12/1995 | Brown et al. | |
| 5,608,622 A | 3/1997 | Church | |
| 5,867,811 A * | 2/1999 | O'Donoghue | 704/1 |
| 5,991,710 A | 11/1999 | Papineni et al. | |
| 6,182,026 B1 | 1/2001 | Tillmann et al. | |
| 6,236,958 B1 | 5/2001 | Lange et al. | |
| 6,304,841 B1 | 10/2001 | Berger et al. | |
| 6,338,057 B1 | 1/2002 | Weeks | |
| 6,473,896 B1 | 10/2002 | Hicken et al. | |
| 6,542,866 B1 | 4/2003 | Jiang et al. | |
| 6,678,415 B1 | 1/2004 | Popat et al. | |
| 6,848,080 B1 | 1/2005 | Lee et al. | |
| 6,885,985 B2 | 4/2005 | Hull | |
| 6,996,518 B2 | 2/2006 | Jones et al. | |
| 7,191,115 B2 | 3/2007 | Moore | |
| 7,353,165 B2 * | 4/2008 | Zhou et al. | 704/5 |
| 2002/0143537 A1 * | 10/2002 | Ozawa et al. | 704/254 |
| 2002/0198699 A1 | 12/2002 | Greene et al. | |
| 2004/0024581 A1 | 2/2004 | Koehn et al. | |
| 2004/0030551 A1 | 2/2004 | Marcu et al. | |
| 2004/0260533 A1 * | 12/2004 | Wakita et al. | 704/4 |

(Continued)

OTHER PUBLICATIONS

R. D. Brown, "Example-Based Machine Translation in the Pangloss System".

(Continued)

*Primary Examiner*—David R Hudspeth
*Assistant Examiner*—Matthew J Sked
(74) *Attorney, Agent, or Firm*—Fay Sharpe LLP

(57) ABSTRACT

A machine translation method for translating source text from a first language to target text in a second language includes receiving the source text in the first language and accessing a library of bi-fragments, each of the bi-fragments including a text fragment from the first language and a text fragment from the second language, at least some of the bi-fragments comprising non-contiguous bi-fragments in which at least one of the text fragment from the first language and the text fragment from the second language comprises a non-contiguous fragment.

20 Claims, 6 Drawing Sheets

U.S. PATENT DOCUMENTS

2005/0108000 A1 5/2005 Kempe et al.
2005/0228643 A1 10/2005 Munteanu et al.
2006/0009963 A1 1/2006 Gaussier et al.
2007/0033001 A1 2/2007 Muslea et al.

OTHER PUBLICATIONS

M. Carl, A. Way, "Workshop on Example-Based Machine Translation", MT-SUMMIT VIII, Santiago de Compostela, Spain, Sep. 18-22, 2001.

M. Simard, N. Cancedda, B. Cavestro, M. Dymetman, E. Gaussier, C. Goutte, K. Yamada, "Translating with non-continuous phrases", (English Translation of Traduction Automatique Statistique Avec Des Segments Discontinues) 12$^{th}$ Annual Conference on the Automatic Treatment of Natural Language (TALN), pp. 233-242, Dourdan, France, (Jun. 2005).

U.S. Appl. No. 11/431,393, filed May 10, 2006, Cancedda, et al.

U.S. Appl. No. 11/789,089, filed Apr. 20, 2007, Pacull.

A.Crabtree, J.O'Neill, P.Tolmie, S.Castellani, T.Colombino, A.Grasso, The Practical Indispensability of Articulation Work to Immediate and Remote Help-Giving, *Proc. of the 2006 ACM Conference on Computer Supported Cooperative Work*, Banff: ACM Press, 2006.

A.Kempe, Acronym-Meaning Extraction from Corpora Using Multitape Weighted Finite-State Machines, *Xerox Corporation, Research Report* 2006/019, Jul. 26, 2006.

A.Kempe, F.Guingne, F.Nicart, Algorithms for Weighted Multi-Tape Automata, *Xerox Corporation, Research Report* 2004/031, Meylan, France, 2004.

A.Kempe, J.M.Champarnaud, J.Eisner, A Note on Join and Auto-Intersection of n-ary Rational Relations, *In B. Watson and L. Cleophas, editors, Proceedings Eindhoven FASTAR Days*, No. 04-40 in TU/e CS TR, pp. 64-78, Eindhoven, Netherlands, 2004.

A.Kempe, J.M.Champarnaud, J.Eisner, F.Guingne, F.Nicart, A Class of Rational n-WFSM Auto-Intersections, *In FSMNLP*, Helsinki, Finland, 2005.

A.P.Dempster, et al., Maximum Likelihood from Incomplete Data Using the EM Algorithm, *Journal of the Royal Statistical Society, Series B (Methodological)*, vol. 39, No. 1, pp. 1-38, 1977.

B.Efron, C.Morris, *Stein's Paradox in Statistics*, Scientific American, 236, 119-127, 1977.

C.Chenon, *Vers une meilleure utilisabilite des memoires de traduction fondee sur un alignement sous-phrastique*. These de Doctorat, Universite Joseph Fourier, Oct. 2005 (Abstract).

C.Goutte, et al., "Aligning Words Using Matrix Factorisation", In: *42nd Annual Meeting of the Association for Computational Linguistics*, Jul. 25-26, 2004, Barcelona, Spain.

D.Chiang, *A Heirarchical Phrase-Based Model For Statistical Machine Translation*, Proc. 43$^{rd}$ Meeting of the Association for Computational Linguistics (ACL), Ann Harbor, Michigan, Jun. 2005.

D.Yarowsky, G.Ngai, R.Wicentowski, "Inducing Multilingual Text Analysis Tools Via Robust Projection Across Aligned Corpora", *In Proceedings of HLT*, San Diego, CA, 2001.

É. Gaussier, Flow Network Models for Word Alignment and Terminology Extraction from Bilingual Corpora, *In Proceedings of the 36$^{th}$ Annual Meeting of the Association for Computational Linguistics and 17$^{th}$ Intl Conference on Computational Linguistics*, pp. 444-450, San Francisco, CA, 1998.

E.Hovy, et al., Principles of Context-Based Machine Translation Evaluation, *Machine Translation*, 17:43-75, Netherlands, 2002.

F.J.Och, C.Tillman, H.Ney, Improved Alignment Models for Statistical Machine Translation, *In Proceedings of EMNLP/VLC* 1999, pp. 20-28, University of Maryland, College Park, MD, 1999.

F.J.Och, et al., A Comparison of Alignment Models for Statistical Machine Translation, *In Proc. of the 18$^{th}$ Intl. Conf. on Computational Linguistics*, vol. 2, pp. 1086-1090, Morristown, NJ, 2000.

H.Dejean, E.Gaussier, J.M.Renders, F.Sadat, Automatic Processing of Multilingual Medical Terminology: Applications to Thesaurus Enrichment and Cross-Language Information Retrieval, *Artificial Intelligence in Medicine*, vol. 33, No. 2, pp. 111-124, 2005.

H.Dejean, F.Sadat, E.Guassier, Bilingual Lexicon Extraction: Using and Enriching Multilingual Thesauri, *Proceedings of Terminology Knowledge Extraction*, Nancy, France, Aug. 2002.

http://en.wikipedia.org/wiki/Poisson_distribution.

I.Dagan, K.Church, Termight: Coordinating Man and Machine in Bilingual Terminology Acquisition, *Journal Tex*, Jul. 24, 1996.

J.Martin, R.Mihalcea, T.Pedersen, Word Alignment for Languages with Scarce Resources, *In Proceedings of ACL Workshop on Building and Using Parallel Text*, Ann Arbor, MI, 2005.

Lodhi, et al., *Text Classification Using String Kernels*.

M.Simard, P.Plamondon, Bilingual Sentence Alignment: Balancing Robustness and Accuracy, *Machine Translation*, vol. 13, No. 11, Mar. 1998.

N.Aswani, R.Gaizauskas, A Hybrid Approach to Align Sentences and Words in English-Hindi Parallel Corpora, *In ACL Workshop on Building and Using Parallel Text*, 2005.

K.Papineni, et al., Bleu: A Method for Automatic Evaluation of Machine Translation, *Proc. of the 40$^{th}$ Annual Meeting of the Assn. for Computational Linguistics (ACL)*, Philadelphia, pp. 311-318, Jul. 2002.

P.Koehn, F.J.Och, D.Marcu, Statistical Phrase-Based Translation, *In Proceedings of HLT-NAACL*, Edmonton, Canada, 2003.

R.C.Moore, A Discriminative Framework for Bilingual Word Alignment, *Proceedings of HLT/EMNLP*, pp. 81-88, Vancouver, BC, Canada, Oct. 2005.

S.Kumar, W.Byrne, A Weighted Finite State Transducer Implementation of the Alignment Template Model for Statistical Machine Translation, *In HLT-NAACL 2003, Main Papers*, pp. 63-70, Edmonton, Canada, May-Jun. 2003.

S.Vogel, H.Ney, C.Tillmann, HMM-Based Word Alignment in Statistical Translation, *In COLING 96*, Copenhagen, 1996.

P.F. Brown, S.A.D. Pietra, V.J.D. Pietra, R.L. Mercer, "The Mathematics of Statistical Machine Translation: Parameter Estimation", Computational Linguistics, 19(2):263-311 (1993).

C.Goutte, K. Yamada, E. Gaussier, "Aligning Words Using Matrix Factorisation", Proc. ACL'04, pp. 503-510 (2004).

P. Koehn, "PHARAOH: A Beam Search Decoder for Phrase-Based Statistical Machine Translations Models", USC Information Science Institute (Dec. 2003).

F.J. Och and H. Ney, "A Systematic Comparison of Various Statistical Alignment Models", Computational Linguistics, 29(1):19-51 (Mar. 2003).

F.J. Och and H. Ney, "The Alignment Template Approach to Statistical Machine Translation", Computational Linguistics, 30(4):417-449 (2004).

C. Tillmann, F. Xia, "A Phrase-Based Unigram Model for Statistical Machine Translation", Proc. of the HLT-NAACL 2003 Conference, Edmonton, Canada (2003).

N. Ueffing, F.J. Och, H. Ney, "Generation of Word Graphs in Statistical Machine Translation", Proc. of the 7$^{th}$ Conference on Empirical Methods in Natural Language Processing (EMNLP), pp. 156-163, Philadelphia 2002.

R. Zens and H. Ney, "Improvements in Phrase-Based Statistical Machine Translation", Proc. of the Human Language Technology Conference (HLT-NAACL) (2004).

* cited by examiner

```
procedure fragmentCombine(x, y)
    // Copy x into z:
    z ← x
    // Find the first gap in x:
    while i ≤ |x| and x_i ≠ ◊
        i ← i + 1

// Combine with y:
    for j ← 1...|y|
        if y_j = ◊ or i + j > |x| or x_{i+j} = ◊
            z_{i+j} ← y_j
        else
            return notCompatible
    return z
```

FIG. 4

```
procedure sourceCover(s'_1, d^K_1)
    // Allocate V and initialize it to zero:
    |V| = I
    V ← 0
    // Examine all decisions:
    for k ← 1...K
        i ← i(d_k)
        x ← source(d_k)
        for j = 1...|x|
            if x_j ≠ ◊
                V_{i+j-1} ← k
    return V
```

FIG. 5

MACHINE TRANSLATION USING NON-CONTIGUOUS FRAGMENTS OF TEXT

BACKGROUND

The present exemplary embodiment is directed to the field of machine translation. It finds particular application in the translation of non-contiguous bi-fragments of text.

A recent development in statistical machine translation has entailed the step from word-based models to phrase-based models. While in traditional word-based statistical models, the atomic unit that translation operates on is the word, phrase-based methods acknowledge the significant role played in language by multi-word expressions, thus incorporating, in a statistical framework, the insight behind Example-Based Machine Translation. Example-Based Machine Translation seeks to exploit and integrate a number of knowledge resources, such as linguistics and statistics, and symbolic and numerical techniques, for integration into one framework. In this way, rule-based morphological, syntactic and/or semantic information is combined with knowledge extracted from bilingual texts which is then re-used in the translation process.

Many recent natural language translation methods operate on the basis of bi-fragments: these are pairs of equivalent fragments of text, one in the source language (the language in which a document to be translated is expressed), one in the target language (the language into which the document is to be translated). Such methods are often collectively referred to as "phrase-based methods". The bi-fragments on which they operate are harvested automatically from large collections of previously translated texts ("bilingual parallel corpora"), and stored in a database. When given a new segment of text to translate, these systems search the database to extract all relevant bi-fragments, i.e., items in the database whose source-language fragment matches some portion of the new input. A subset of these matching bi-fragments is then searched for, such that each word of the input text is covered by exactly one bi-fragment in the subset, and that the combination of the target-language fragments produces a coherent translation.

However, phrase-based models proposed so far only deal with multi-word units that are sequences of contiguous words on both the source and the target side.

In many translation systems, the quality of the resulting translation is assessed by means of a statistical translation model, which estimates the probability of observing some target-language segment of the text as the translation of the given source-language input. The translation problem reduces to that of finding the combination of bi-fragments which produces the most probable translation. This is a complex task, because the number of possible translations typically grows exponentially with the size of the input, and so not all solutions can be examined in practice. Sub-optimal search procedures are usually employed, that rely on dynamic programming, A*-like beam-search, or heuristic hill-climbing methods.

INCORPORATION BY REFERENCE

The following references, the disclosures of which are incorporated herein in their entireties by reference, are mentioned:

U.S. Pat. No. 5,477,451 by Brown, et al. entitled "METHOD AND SYSTEM FOR NATURAL LANGUAGE TRANSLATION," and U.S. Pat. No. 6,304,841 by Berger, et al., entitled "AUTOMATIC CONSTRUCTION OF CONDITIONAL EXPONENTIAL MODELS FROM ELEMENTARY FEATURES" describe word-based statistical machine translation methods and systems for natural language translation. In the U.S. Pat. No. 6,304,841 patent, log-linear features are used to score word hypotheses depending on their lexical context.

The following references relate to phrase-based statistical machine translation methods. U.S. Pat. No. 6,182,026 by Tillmann, et al., entitled "METHOD AND DEVICE FOR TRANSLATING A SOURCE TEXT INTO A TARGET USING MODELING AND DYNAMIC PROGRAMMING," discloses a method and device for translating a source text into a target using modeling and dynamic programming. The method uses a monotonic phrase-based decoder for translation of contiguous phrases.

U.S. Published Application No. 2004/0024581 by Koehn, et al., entitled "STATISTICAL MACHINE TRANSLATION," discloses a phrase-based statistical machine translation method using syntactic markers for contiguous phrases.

U.S. Published Application No. 2004/0030551 by Marcu, et al., entitled "PHRASE TO PHRASE JOINT PROBABILITY MODEL FOR STATISTICAL MACHINE TRANSLATION" discloses a phrase to phrase joint probability model for statistical machine translation. The phrase-based translation is performed using a generative approach (joint model for source-target).

BRIEF DESCRIPTION

Aspects of the exemplary embodiment relate to a machine translation method and system for machine translation.

In one aspect, a machine translation method for translating source text from a first language to target text in a second language includes receiving the source text in the first language and accessing a library of bi-fragments, each of the bi-fragments including a text fragment from the first language and a text fragment from the second language. At least some of the bi-fragments are non-contiguous bi-fragments in which at least one of the text fragment from the first language and the text fragment from the second language comprises a non-contiguous fragment. Text fragments from the second language are retrieved from the library. At least one target hypothesis is generated, each of the target hypotheses comprises text fragments selected from the second language. In another aspect, a machine translation system includes a memory which stores a library of bi-fragments. Each of the bi-fragments includes a source text fragment from a first language and a corresponding target text fragment from the second language. At least some of the bi-fragments in the library are non-contiguous bi-fragments. A processing component receives text comprising source text fragments selected from the first language the processing component accessing the memory to retrieve stored text fragments from the second language.

In another aspect, an article of manufacture includes a program storage medium readable by a computer. The medium includes a processing component which translates source text comprising source text fragments selected from a first language and outputs at least one hypothesis comprising target text fragments selected from a second language, different from the first language. The processing component is configured for accessing an associated memory to retrieve stored text fragments from the second language. The memory stores bi-fragments comprising a text fragment in the first language and a corresponding text fragment in the second language. The processing component including a scoring function which includes a first feature function which evaluates bi-fragment discontinuities and a second feature function which evaluates bi-fragment reorderings, whereby a hypothesis which includes a non-contiguous fragment in at least one of the first language and the second language is scored.

BRIEF DESCRIPTION OF THE DRAWINGS

FIG. 4 illustrates an exemplary fragment combination procedure;

FIG. 5 illustrates an exemplary source coverage procedure;

DETAILED DESCRIPTION

Aspects of the exemplary embodiment relate to a computer implemented system and method for translating source text from a first language to target text in a second language different from the first language and to a method of training such a translation system. In one aspect, a phrase-based statistical machine translation method is provided, based on non-contiguous phrases, i.e., phrases with gaps, in which each gap represents a word.

In one aspect, a method for producing such phrases from word-aligned corpora is provided. In another aspect, a statistical translation model is provided that deals with such phrases. In another aspect, a training method is provided which is based on the maximization of translation accuracy, for example, as measured with the National Institute of Standards and Technology (NIST) evaluation metric. The translations may be produced by means of a beam-search decoder or other suitable optimizing function which takes into account the probabilities of various hypothetical translations being found in practice.

The exemplary translation method translates natural language text, using as primary resource a collection of bi-fragments, i.e., matching pairs of source-target fragments of text. Translations are produced by combining together such bi-fragments. A search for the optimal combination may be performed by means of a specially adapted, multiple-stack beam search. Within this search procedure, the potential of each candidate translation is evaluated by means of a statistical model of translation.

A "phrase," as used herein generally refers to two or more words in either the source or target language.

A "non-contiguous phrase" refers to two or more words in either the source or target language wherein two of the words are separated by a gap of at least one word. The size of the gap, in terms of the number of words, may be specified, such as one, two, three, words, etc, or may be limited to a maximum and/or minimum number of words N, where N may be, for example, from 1 to 5. The maximum gap N may be different for one phrase than for another, based on the statistical probabilities for a particular phrase.

A "bi-fragment," as used herein, generally comprises two text fragments: a first text fragment in the source language and a second text fragment in the target language, which is a translation of the first text fragment. The first and second text fragments may be a word or a phrase. The first and second fragments are associated in a word-aligned corpora, such as a library, whereby a target fragment corresponding to an input source fragment may be retrieved. It will be appreciated that a text fragment in one language may appear in more than one bi-fragment, where multiple translations exist.

A "non-contiguous bi-fragment," as used herein, refers to a bi-fragment in which at least one of the text fragments comprises a non-contiguous phrase.

Figure 1:
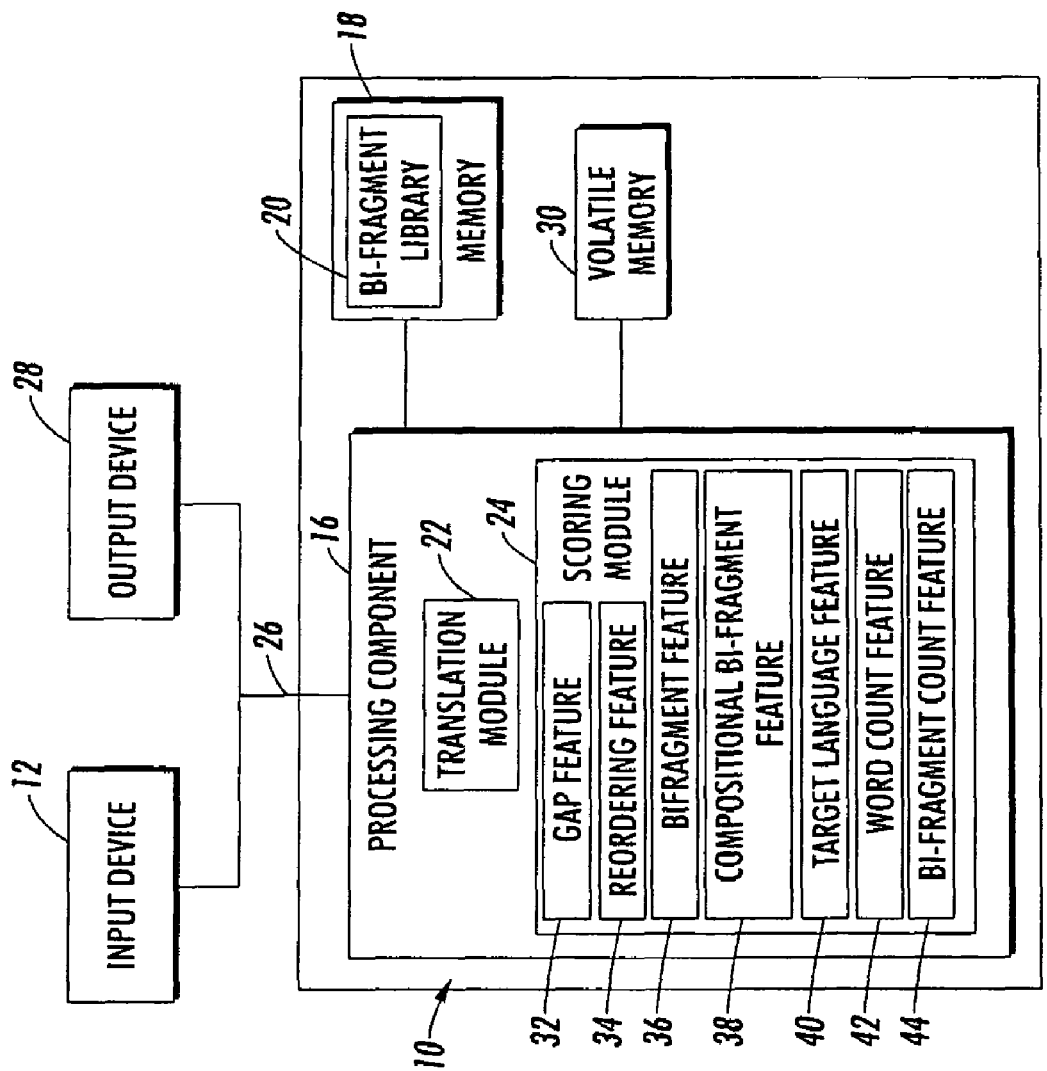
FIG. 1 is a block diagram of a system for machine translation of text which utilizes non-contiguous bi-fragments according to one aspect of the exemplary embodiment.

With reference to FIG. 1, a block diagram of an automated natural language translation system 10 for translating text comprising non-contiguous bi-fragments is illustrated. Text is input to the system by an input device 12. Input text may be directly input into the natural language translation system 10 (for example, as with a person typing sentences into a computer using a keyboard). Alternatively, input text to natural language translation system 10 may be the output of another system, such as, for example, output from a speech recognition system (for example, speech input device) or from an optical character recognition system (not shown). Or the text may be input from a database or word document. The text may include one or more sentences, such as a paragraph or an entire document comprising multiple paragraphs.

The translation system 10 includes a processing component 16 and a memory component 18. A part or all of the memory component 18 may be located remote from the processing component 16 and accessed by a wired or wireless link. The memory component stores a library of bi-fragments 20, including non-contiguous bi-fragments. The processing component 16 includes a translation module 22. Working on a string of contiguous words in the source language, such as a sentence of the input text, the translation module accesses the library 20 to retrieve fragments in the target language corresponding to input fragments in the source language text string. The processing component includes a scoring module 24 which evaluates translation hypotheses to identify probable translations of the text string. A system bus 26 provides outputs to an output device 28, such as one or more of a visual display device (such as a monitor with a screen), a hard copy device (such as a printer), and an audible output device (such as, for example, an audio speaker). Translated strings of text and the entire text, once translated, may be stored in volatile or non-volatile memory 30. The system 10 may be instantiated in a personal computer in which the memory 18 may include, for example, read only memory (ROM), random access memory (RAM), flash memory, or any combination of the above. Alternatively, the processing component accesses a remote database which stores the bi-fragment library, for example, via the internet or via a network link. It will be appreciated that computer system 10 may be controlled by operating system software which includes a file management system, such as, for example, a disk operating system, which is part of the operating system software. The file management system may be stored in a non-volatile memory storage device, such as memory 18 and may be configured to cause processing component 16 to execute the various functions required by the operating system to input and output data and to store data in volatile memory 30.

Figure 2:
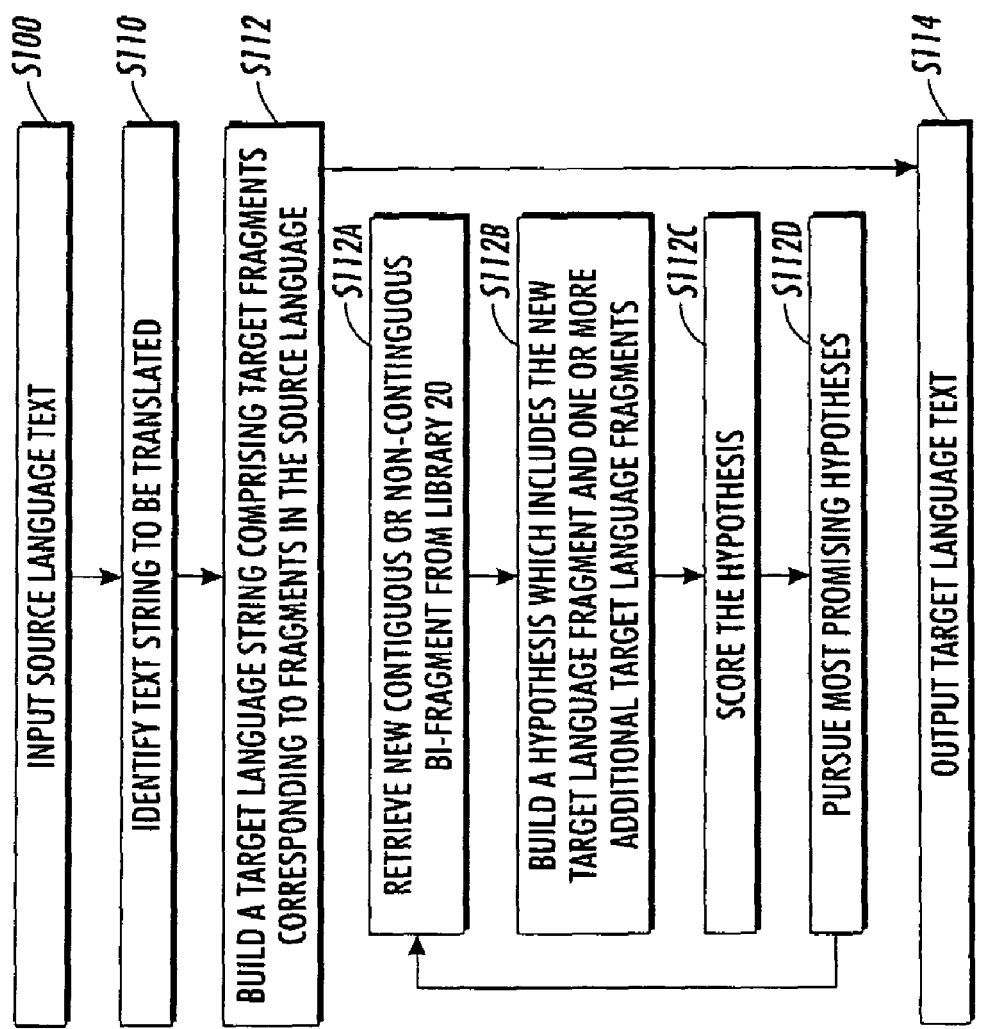
FIG. 2 is a flow diagram of a method for machine translation of text which utilizes non-contiguous bi-fragments according to one aspect of the exemplary embodiment.

FIG. 2 illustrates steps in an exemplary method for translation of text comprising non-contiguous bi-fragments. It will be appreciated that the method may include fewer or more steps and that the steps need not proceed in the order outlined. At step S100, source text to be decoded is input to the system 10. At step S110, the processing component 16 identifies a string of the source text to be translated. This step may include a tokenizing procedure, in which the processing component identifies words in the text, as well as punctuation marks. At step S112, the processing component builds a target language string comprising target fragments corresponding to fragments in the source language. Step S112 may include multiple sub-steps in which the processor retrieves from bi-fragment library 20 a target language fragment corresponding to a fragment of the source language (Substep S112A), builds a hypothesis which includes the target language fragment and one or more additional target language fragments (Substep S112B), scores the partial hypothesis based on a predetermined set of scoring parameters (Substep S112C) and pursues a set of the most promising (highest scoring) partial hypotheses (Substep S112D) by eliminating low scoring hypotheses. Steps S112A, 112B, 112C, 112D may be repeated multiple times in the process of generating a target language text string. The target language text string corresponding to the highest scoring complete hypothesis is then output at Step S114. These steps will be described in greater detail below.

As will be appreciated, at step S112A, the library 20 may identify a non-contiguous bi-fragment which is retrieved by the processing component and which may ultimately used in translation of the text string. The library also includes contiguous bi-fragments, one or more of which may be utilized in combination with one or more non-contiguous bi-fragments in translation of the source language text string.

Non-Continuous Bi-Fragments

Aspects of the exemplary embodiment relate to a translation method which has the ability to produce translations from bi-fragments whose source and/or target fragments contain discontinuities, i.e., fragments made up of words that do not necessarily appear contiguously in text. One motivation for using such bi-fragments is to make better usage of the bilingual corpora from which the bi-fragments are acquired, while giving the system the ability to handle non-contiguous bi-fragments in natural language.

Examples of non-contiguous bi-fragments abound in many natural languages. As an example, in French, negation is typically constructed by inserting the words "ne" and "pas" before and after the verb or auxiliary. Thus, "Je ne mange pas" translates to "I do not eat" in English. Standard phrase-based methods cannot handle this properly unless they have translations for the whole fragment "ne mange pas" in their database. In the present system, this is naturally handled by a non-contiguous bi-fragment such as ["ne_pas", "do not"], where the "_" represents a gap, and, in the present example, occupies the space of exactly one word.

An example in English is that many idiomatic expressions are constructed from the combination of a verb and a preposition, which can appear non-contiguously: "Switch the light off" translates in French to "Éteindre la lumière," while "Switch the light on" translates to "Allumer la lumière". Both are handled by non-contiguous bi-fragments such as ["allumer", "switch_on"] and ["éteindre", "switch_off"]. Here the gaps(_) both occupy the space of two words, although larger gaps can be envisaged.

Bi-fragment Libraries

To produce translations, the method relies on a collection of bi-fragments, which is referred to as a bi-fragment library 20. Techniques exist to construct such libraries from a corpus of existing translations, aligned at the level of words. Such a technique is described, for example, in M. Simard, N. Cancedda, B. Cavestro, M. Dymetman, E. Gaussier, C. Goutte, P. Langlais, and K. Yamada, "Traduction Automatique Statistique Avec Des Segments Discontinues," in 12$^{th}$ Annual Conference on the Automatic Treatment of Natural Language (TALN), pages 233-242, Dourdan, France (June 2005) (hereinafter "Simard"). In one aspect, the present method adapts an existing library to include non-contiguous bi-fragments.

Two strategies are outlined in Simard for producing non-contiguous bi-phrases for these libraries. The first is to align the words using a "standard" word alignment technique, such as the Refined Method described in Franz Josef Och and Hermann Ney, "A Systematic Comparison of Various Statistical Alignment Models," Computational Linguistics, 29(1): 19-51 (March 2003) (Och and Ney, 2003) (the intersection of two IBM Viterbi alignments, forward and reverse, enriched with alignments from the union) and then generate bi-phrases by combining together individual alignments that co-occur in the same pair of sentences. A difference from other phrase-based machine translation approaches is that it is not restricted to combinations that produce strictly contiguous bi-phrases. The second strategy is to rely on a word-alignment method that naturally produces many-to-many alignments between non-contiguous words, such as the method described in Cyril Goutte, Kenji Yamada, and Eric Gaussier, "Aligning Words Using Matrix Factorisation," in Proc. ACL'04, pages 503-510 (2004) (hereinafter Goutte 2004). By means of a matrix factorization, this method produces a parallel partition of the two texts, seen as sets of word tokens. Each token therefore belongs to one, and only one, subset within this partition, and corresponding subsets in the source and target make up what are called cepts. These cepts naturally constitute bi-phrases, and can be used directly to produce a bi-phrase library. The two strategies may be combined. Additionally, it is always possible to produce increasingly large and complex bi-phrases by combining together co-occurring bi-phrases, contiguous or not. As the size of the bi-phrase increases, its usefulness diminishes in terms of the likelihood of it being found in any text to be translated and its incorporation in the library may not be warranted in view of the desired size of the library.

An Adapted Beam-Search Translation Method

It will be appreciated that a source string may be translated as multiple different target strings where multiple alternative bi-fragments exist. The exemplary translation system may employ a log-linear statistical translation model for identifying statistically probable translations. Such models use probability functions to identify a target language string with maximum entropy, i.e., a string which optimizes one or more functions which model statistically probable translations. Using non-contiguous bi-fragments in phrase-based translation methods raises a number of issues for the statistical translation model, which the present method addresses. In one aspect, two new components ("feature functions") are added to a log-linear statistical translation model. A first feature function models bi-fragment discontinuities within known translations, by counting the total number of gaps appearing in the set of source and target fragments that make up the translation (illustrated as a "gap feature" 32 on FIG. 1). In this way, proposed translations having a total number of gaps which falls within a statistically probable range are favored over translations where the total number of gaps falls within a statistically improbable range.

A second feature function models bi-fragment reorderings, i.e., differences in the order of fragments in the source and the target languages, by counting, for each bi-fragment used in the translation, the number of source-language words to the left of the bi-fragment's source-language part, that are translated by target-language words located to the right of this bi-fragment's target-language part (illustrated as a "reordering feature" 34 on FIG. 1). Thus, proposed translations which result in probable reorderings are favored over improbable ones.

A multiple-stack beam-search procedure for phrase-based translation may be adapted to deal with non-contiguous phrases. An exemplary multiple-stack beam-search procedure is described in Philipp Koehn, "PHARAOH: A Beam Search Decoder For Phrase-Based Statistical Machine Translation Models," USC Information Science Institute (December 2003). This procedure may be modified to account for discontinuities.

In the modified multiple-stack beam-search procedure (S112D), some or all of the following procedures may be adopted to deal with non-contiguous phrases:

1. Replacing a standard left-to-right string concatenation operation with a fragment-combination procedure which, given as input a pair of fragments that possibly contain discontinuities in the form of gaps, returns as output either a combined fragment (possibly discontinuous as well), or a special "incompatible fragments" symbol.
2. Introducing a well-formedness verification procedure: this is to validate whether a given complete translation for the input source string is valid or not. In practice, this procedure verifies whether or not the translation contains gaps, in which case it is generally considered not valid.
3. Introducing translation scoring update procedures for the new feature functions 32, 34 introduced above. The role of the update procedure is to compute how combining a new bi-fragment to an existing partial translation (translation hypothesis) affects the probability (score) of the resulting translation. Update procedures are employed for each of the feature functions that make up the log-linear statistical translation model.
4. Introducing heuristic translation completion estimation procedures for the new feature functions 32, 34 introduced above. The role of these estimation procedures is to produce, given a partial translation, an approximation of the cost (or gain) to complete the translation. Estimation procedures are employed for each of the feature functions that make up the log-linear statistical translation model.
5. Replacing the translation scoring update function and completion estimation function for the N-gram language model. Such a language model is used in all current phrase-based translations systems, and may be included in the present system. Allowing for discontinuous partial translations involves modifying the procedure that computes the language model contributions to the probability of the translation.
6. Replacing the conventional hypothesis merging verification procedure with one that takes discontinuities into account. This procedure is used during the search to establish whether two partial translations have identical optimal completions, in which case they can be "merged", i.e., only the most promising (in terms of probability) need be pursued. This component is particularly valuable in allowing a reduction in the search-space in the beam-search procedure.
7. Introducing a timeout-controlled gradual refinement beam-search procedure: In practice, it is more computationally costly to translate with non-continuous bi-fragments than without, because some of the basic operations (such as the fragment-combination and hypothesis-merging procedures) are more costly, but more importantly because there are more bi-fragments available to translate a given input, and therefore the search-space is larger.

To gain a better control on execution times (procedure 7 above), a variant to the beam-search procedure is introduced, in which the search is repeated with an increasing beam: A first search is performed with a very narrow beam, which produces a first translation. Then the beam-size is incremented, and the search is redone, producing a second solution, at least as good as the first. Special provisions are taken so that results computed in the first search need not be recomputed in the second. This process is repeated until some maximum beam-width is reached, or until some pre-determined timeout period is over. The translation resulting from the last iteration is then retained.

The beam-width is the maximum number of alternative hypotheses being simultaneously pursued. For example, a first search is performed with a beam-width of 25 (a maximum of 25 hypotheses). Hypotheses in excess of this number are periodically culled by removing statistically less probable hypotheses). A subsequent search may be performed, for example, with a beam-width of 100.

A Translation Model

A bi-fragment can be defined as a pair comprising a source fragment and a target fragment: $b=(x, y)$. Each of the source and target fragments is a sequence of words and gaps (indicated by the symbol $\diamond$). Each gap acts as a placeholder for exactly one unspecified word. For example, $\tilde{w}=w_1 w_2 \diamond w_3 \diamond \diamond w_4$ is a fragment of length 7, made up of two contiguous words $w_1$ and $w_2$, a first gap, a third word $w_3$, two consecutive gaps and a final word $w_4$. To avoid redundancy, fragments may not begin or end with a gap. If a fragment does not contain any gaps, we say it is contiguous; otherwise it is non-contiguous. Likewise, a bi-fragment is said to be contiguous if both its fragments are contiguous.

The translation of a source sentence s is produced by combining together bi-fragments so as to entirely cover the source sentence, and produce a well-formed target-language sentence, i.e., a sequence without gaps. More formally, a complete translation for s can be described as an ordered sequence of decisions $d_1 \ldots d_K$, each of which is a pair $d_k=[i, b]$, where b is a bi-fragment, and i is its source position, i.e., the position in s of the leftmost word in the source language fragment of b. The resulting translation t can be obtained by combining the target-language fragments of the decisions, in the order given by the sequence of decisions: the first fragment is first laid down, then the others are successively positioned either over the leftmost gap, or at the right end of the translation if there are no gaps.

Figure 3:
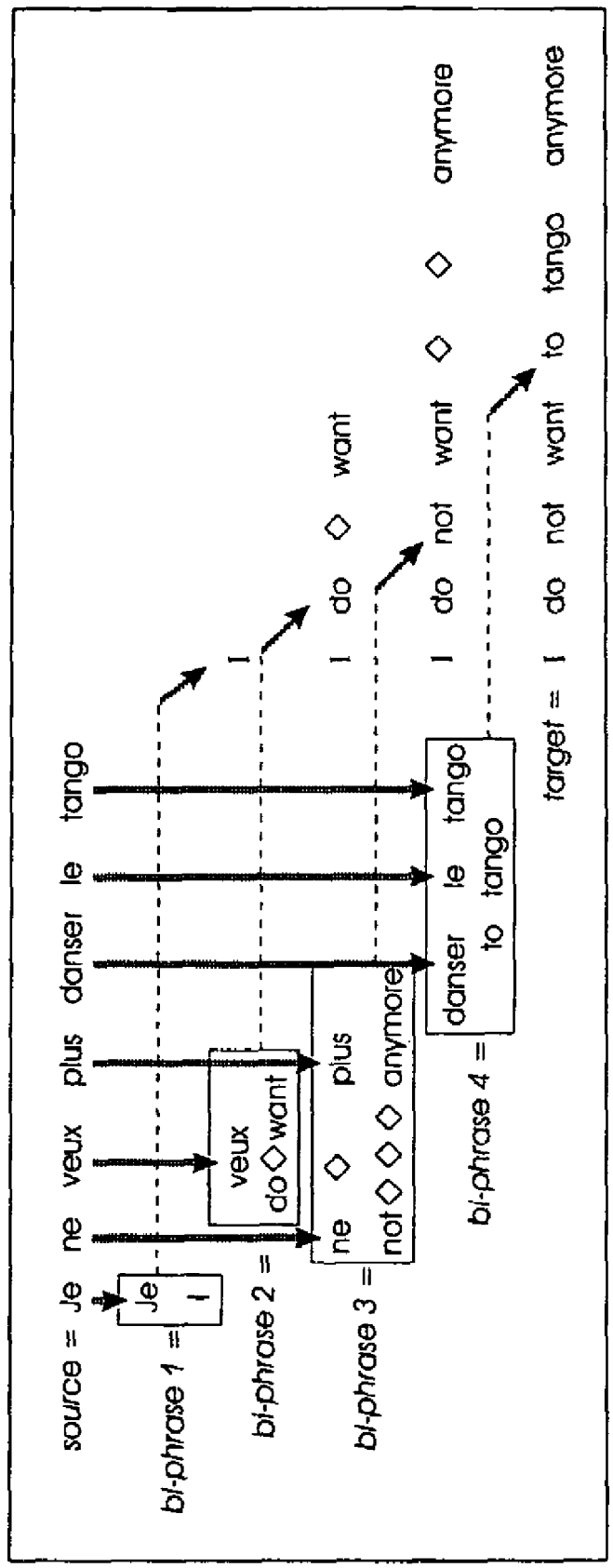
FIG. 3 is an example of the combination of bi-fragments to produce a translation.

FIG. 3 illustrates the process of constructing a translation from bi-fragments with an example. There, bi-fragment 3 (<ne $\diamond$ plus, not $\diamond$ $\diamond$ $\diamond$ anymore>) has source position i=2, i.e., the leftmost word of its source language fragment ("ne") covers the second word in the source language sentence. The combination of its target-language fragment with the fragment "/ do $\diamond$ want" results in the new partial translation "/ do not want $\diamond$ $\diamond$ anymore". Overall, the translation of the sentence is given by the following sequence of decisions:

$d_1=[i=1, b=$<Je, I>$]$ $d_2=[i=3, b=$<veux, do $\diamond$ want>$]$ $d_3=[i=2, b=$<ne $\diamond$ plus, not $\diamond$ $\diamond$ $\diamond$ anymore>$]$ $d_4=[i=5, b=$<danser le tango, to dance tango>$]$ In the following discussion b(d) denotes the bi-fragment associated with decision d, i(d) its source position, source(b) and target(b) are the source language (SL) and target language (TL) fragments of bi-fragment b source (d) and target (d) denote source(b(d)) and target(b(d)) respectively.

An exemplary procedure by which target-language fragments are combined from left to right is illustrated in FIG. 4. A "fragmentCombine" procedure takes, as input, two fragments x and y, i.e., sequences of words and gaps, and returns a new fragment z that either combines the words of x and y, while possibly eliminating gaps, or outputs a special symbol "notCompatible," meaning that x and y can not be combined.

Statistical Model

Many existing machine translation systems are based on probability models, that assign to any TL sequence $t_1^J$ a probability of being a translation of a SL sequence $s_1^I$. The general approach in statistical machine translation is to find the most probable translation for $s_1^I$:

$$\hat{t}_1^J = \underset{t_1^J}{\operatorname{argmax}} \, Pr(t_1^J \mid s_1^I) \tag{1}$$

A typical approach to approximating $Pr(t_1^J \mid s_1^I)$ is based on so-called log-linear models, as described, for example, in Christoph Tillmann and Fei Xia., "A Phrase-Based Unigram Model For Statistical Machine Translation," in Proc. of the HLT-NMCL 2003 Conference, Edmonton, Canada (2003), and in Richard Zens and Hermann Ney, "Improvements in Phrase-Based Statistical Machine Translation," in Proceedings of the Human Language Technology Conference (HLT-NAACL) (2004):

$$Pr(t_1^J \mid s_1^I) = \frac{1}{Z_{s_1^I}} \exp\left(\sum_{m=1}^{M} \lambda_m h_m(s_1^I, t_1^J)\right)$$

where each "feature function" $h_m$ scores a particular aspect of the relationship between $s_1^I$ and $t_1^J$; the contribution of each feature function is determined by the corresponding model parameter $\lambda_m$; $Z_{s_1^I}$ is a normalization constant.

Additional variables can be introduced in a log-linear model, so as to account for hidden characteristics, and the feature functions can be extended accordingly. For example, if the translation $t_1^J$ of $s_1^I$ is produced using bi-fragments as described here, the model can be modified to take into account the actual set of decisions that lead to $t_1^J$:

$$Pr(t_1^J, d_1^K \mid s_1^I) = \frac{1}{Z_{s_1^I}} \exp\left(\sum_{m=1}^{M} \lambda_m h_m(s_1^I, t_1^J, d_1^K)\right)$$

Note that given $d_1^K$, $t_1^J$ is actually redundant, because it can be directly derived as $t(d_1^K)$. For uniformity of the notation here, it is retained.

When solving the machine translation problem (Eq. 1) with this type of model, the value of $Z_{s_1^I}$ need not be computed explicitly, because it depends only on $s_1^I$, and so the problem reduces to:

$$\hat{t}_1^J = \underset{t_1^J}{\operatorname{argmax}} \sum_{m=1}^{M} \lambda_m h_m(s_1^I, t_1^J) \tag{2}$$

Feature functions for this sort of statistical translation model, in which bi-fragments are strictly contiguous have been described, for example, in Franz Josef Och and Hermann Ney, "The Alignment Template Approach to Statistical Machine Translation" Computational Linguistics, 30(4):417-449 (2004), and Philipp Koehn, "PHARAOH: A Beam Search Decoder For Phrase-Based Statistical Machine Translation Models, "USC Information Science Institute (December 2003). Most of these feature functions can be used directly within a model that accommodates non-contiguous bi-fragments. For example, the present model can include the following "standard" feature functions 36, 38, 40, 42, and 44 (FIG. 1):

1. A "bi-fragment" feature function $h_{bf}$, illustrated at 36. It represents the probability of producing $t_1^J$ using some set of bi-fragments, under the assumption that each source fragment produces a target fragment independently of the others:

$$h_{bf}(s_1^I, t_1^J, d_1^K) = \sum_{k=1}^{K} \log Pr(\text{target}(d_k) \mid \text{source}(d_k)) \tag{3}$$

Individual bi-fragment probabilities $Pr(\text{target}(d_k) \mid \text{source}(d_k))$ can be estimated based on occurrence counts in the word-aligned training corpus.

2. A "compositional bi-fragment" feature function $h_{comp}$ illustrated at 38. This is introduced to compensate for $h_{bf}$'s strong tendency to overestimate the probability of rare bi-fragments; it is computed as in equation (3), except that bi-fragment probabilities are computed based on individual word translation probabilities, somewhat as in IBM model 1 (See Peter F. Brown, Stephen A. Della Pietra, Vincent J. Della Pietra, and Robert L. Mercer, "The Mathematics Of Statistical Machine Translation: Parameter Estimation," Computational Linguistics, 19(2):263-311, (1993)):

$$Pr(\tilde{t} \mid \tilde{s}) = \frac{1}{|\tilde{s}|^{|\tilde{t}|}} \prod_{t \in \tilde{t}} \sum_{s \in \tilde{s}} Pr(t \mid s)$$

3. A "target language" feature function $h_{tl}$ illustrated at 40. This is based on an N-gram language model of the target language. As such, it ignores the source language sentence and the decomposition of the target into bi-phrases, to focus on the actual sequence of target-language words produced by the combination of bi-phrases:

$$h_{tl}(s_1^I, t_1^J, d_1^K) = \sum_{i=1}^{J} \log Pr(t_j \mid t_{j-N+1}^{j-1})$$

4. "Word-count" and "bi-fragment" count feature functions $h_{wc}$ and $h_{bc}$, illustrated at 42 and 44, respectively.

These control the length of the translation and the number of bi-fragments used to produce it:

$$h_{wc}(s_1^I, t_1^J, d_1^K) = J \quad h_{bc}(s_1^I, t_1^J, d_1^K) = K$$

The two additional feature functions 32, 34 introduced address directly the notion of discontinuities. These are described below.

1. Bi-Fragment Non-Contiguity (Gap feature)

In practice, it is to be expected that contiguous bi-fragments are somewhat more reliable than non-contiguous ones. Therefore, one aspect that the translation scoring function may take into account is the amount of "non-contiguity" that goes into any given translation. To this end, a log-linear model may contain a "gap count" feature function $h_{gaps}$, illustrated at 32, which takes as value the total number of gaps (source and target) within the bi-fragments of $d_1^K$, thus allowing the model some control over the nature of the bi-fragments it uses, in terms of the discontinuities they contain. For example, $h_{gaps}$ may be defined by the expression:

$$h_{gaps}(s_1^I, t_1^J, d_1^K) = \sum_{i=1}^{I} gapCount(b(d_i))$$

where gapcount(b) counts the number of gaps (◊) in the source and target fragments of b.

2. Bi-Fragment Reordering ("Distortion") (Reordering Feature)

A "reordering" feature function $h_{reord}(s_1^I, t_1^J, d_1^K)$, illustrated at 34, measures the difference in order between source and target fragments. Such feature functions are a standard component in most existing phrase-based machine translation systems. However, measuring bi-fragment reorderings when there are discontinuities cannot be readily implemented with conventional techniques.

In one embodiment, a measure of reordering is used which relies on the "source coverage vector" V of the sequence of decisions $d_1 \ldots d_K$. This is a vector with as many elements as there are words in the SL input $s_1^I$; each $V_i$ takes as value the index of the decision $d_k$ whose source fragment covers word $s_i$, or zero if word $s_i$ is not covered by a fragment in $d_1^K$. The coverage vector can be computed using the procedure of FIG. 5. Given $V_s$, we thus measure reordering:

$$h_{reord}(s_1^I, t_1^J, d_1^K) = \sum_{k=1}^{K} \sum_{i=1}^{i(d_k)-1} I(V_i > k) \quad (4)$$

where I( ) returns 1 if its argument is true, 0 otherwise. In other words, $h_{reord}$ sums, for each bi-fragment used to translate $s_1^I$, the number of SL words to the left of the beginning of the current SL fragment, that are translated by TL words from fragments that begin to the right of the current bi-fragment.

Beam Search Procedure

Beam-search procedures are described, for example, in Och and Ney and in Koehn discussed above. In an exemplary beam-search procedure, given as input a source-language sentence $s_1^I$ and a collection of relevant bi-fragments, a translation $t_1^J$ is constructed with certain optimal characteristics. Decoding, as this procedure is called, is done by expanding a search graph on the fly. Each node of the search graph represents a partial translation, which is called a hypothesis; each directed edge connecting one node with another node represents a decision (i.e., which bi-fragment is instantiated in which source position). Each node H in the graph is uniquely defined by the sequence of decisions $d_1^k$ that connect it to an initial "null hypothesis" node $H_0$ (a starting hypothesis in which there are no words translated). Therefore, to each node H corresponds a TL sequence, which is just the combination of the TL portions of the bi-fragments of decisions, which we denote $t(d_1^k)$, or just t(H). Starting from the null hypothesis $H_0$, the search proceeds by extending hypotheses: a hypothesis H is extended by adding an edge d=[i,b] (i.e., a decision) to the search graph, connecting it to a new hypothesis H', corresponding to the (possibly partial) translation resulting from the combination of bi-fragment b with H. This new hypothesis is then pushed onto a stack of hypotheses in need of being extended.

To reduce the search space, translation hypotheses are scored, and the stack is periodically pruned based on these scores, i.e., only the most promising hypotheses are retained on the stack. Furthermore, hypotheses that are deemed equivalent are merged together, so that only one needs to be expanded. The search terminates when all remaining hypotheses on the stack are complete, i.e., they coverall the source words.

Existing decoding procedures assume bi-fragments to be contiguous. The following method adapts a beam search procedure to handle noncontiguous bi-fragments.

Extending Hypotheses in the Beam Search Procedure

Figure 6:
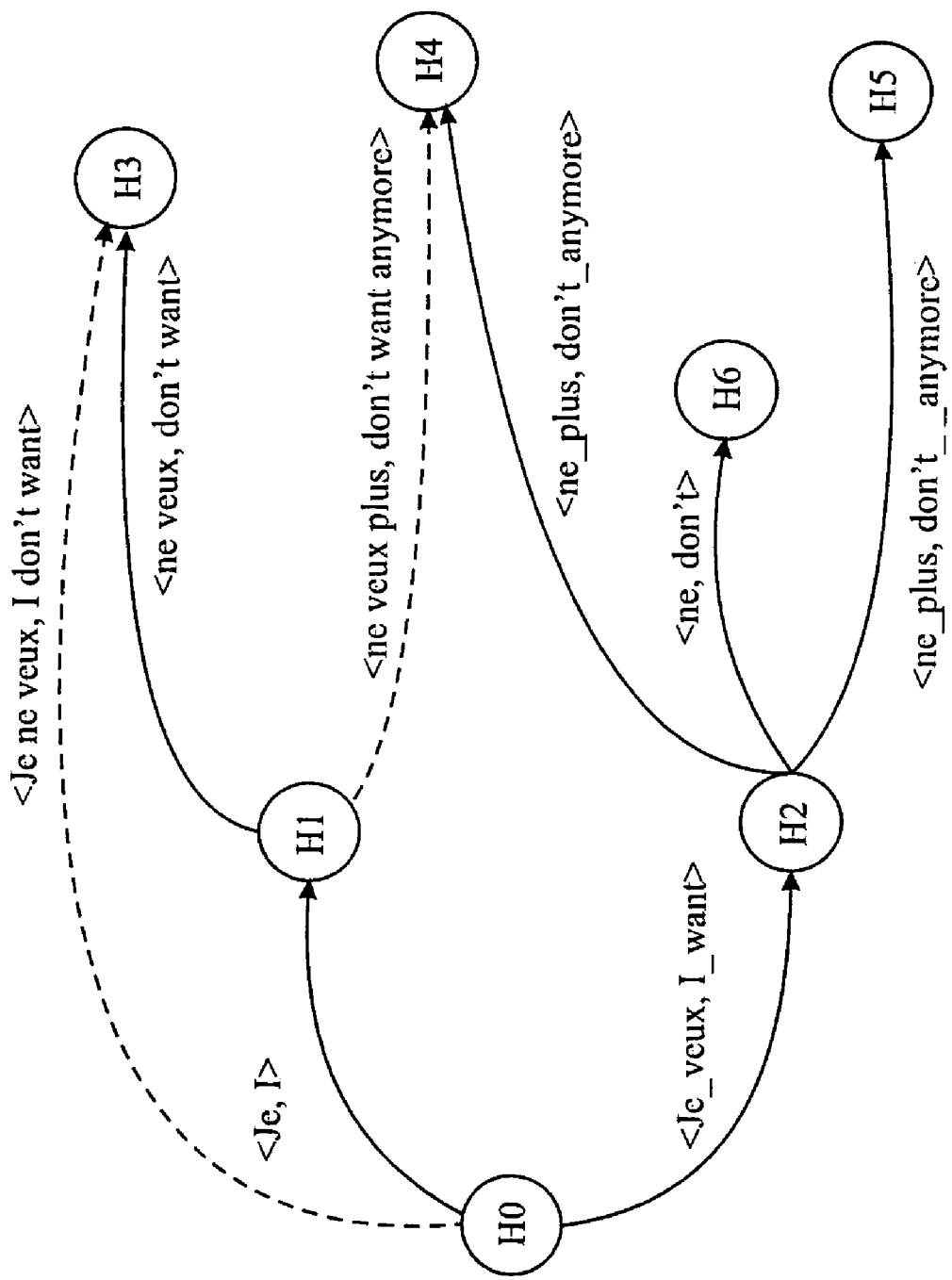
FIG. 6 illustrates an example of a partial translation search graph for a French sentence.

As noted above, extending a hypothesis H means adding an edge (i.e., a decision) to the search graph, connecting it to a new hypothesis H', corresponding to the (possibly partial) translation resulting from the combination of bi-fragment b with H. FIG. 6 illustrates this with the example sentence "Je ne veux plus danser le tango." As illustrated in FIG. 6, the beam search proceeds as for a conventional beam search except as otherwise noted. Hypothesis H4 is a merger of two hypotheses deemed equivalent which are merged together.

With non-contiguous bi-fragments, two conditions are verified before adding an edge d=[i,b] from hypothesis H:

1. The SL fragment source(b) should match the SL words in position i, without overlapping SL words from previous bi-fragments (i.e., bi-fragments in decisions leading to H in the graph); this can be verified using a variant of procedure "sourceCover" (FIG. 5), that returns an error code whenever two bi-fragments cover the same source position.
2. TL words in target (b), when positioned at the proper place (leftmost gap or right end of t(H)) should not interfere with TL words already there. This last verification can be performed by verifying whether fragmentCombine (t(H), target (b)) returns value notCompatible; if not, then the result is t(H') (see FIG. 4).

Additional constraints can be imposed to reduce the search-space. Here are some examples:

1. A limit may be placed on the number of gaps in any partial translation t(H). Note that a constraint which imposes that partial translation t(H) may not contain gaps at all amounts to translating exclusively with contiguous bi-fragments. Thus, for the present application, the limit should be ≧1.
2. A limit may be placed on the number of TL words that appear to the right of the leftmost gap ("dangling words").
3. A limit may be placed on the number of uncovered SL words to the left of i. Note that if the constraint completely disallows uncovered SL words to the left of j, the decoder works as a monotone decoder, meaning that reorderings are not allowed between the source and the target. For most translations, the benefits of bi-fragments are not realized without allowing some reordering.

Figure 7:
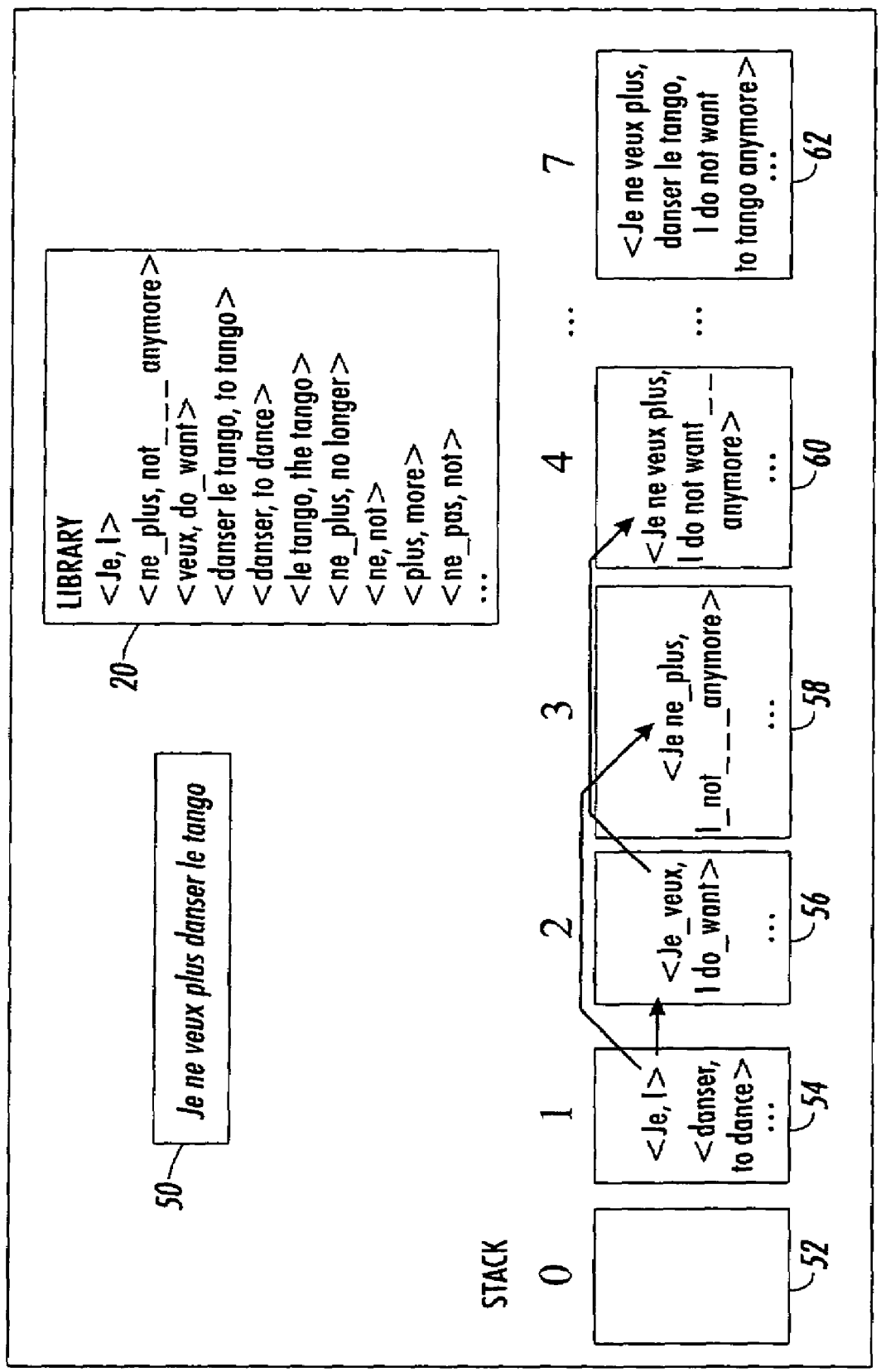
FIG. 7 illustrates the development of hypothesis stacks for the partial translation of FIG. 6.

FIG. 7 illustrates, by way of example, how the stacks utilized in the beam search procedure of FIG. 6 are developed. The string 50 to be translated is matched to the bi-phrase library 20. It will be appreciated that only some of the possible library matches are illustrated. The stacks 52, 54, 56, 58, 60, 62 contain hypotheses of increasing source-coverage size (respectively, 0, 1, 2, 3, 4, and 7 words), with the last stack corresponding to the number of words in the source string. The 0 stack 52, by convention contains a null hypothesis. Stack 1. (identified as 52) contains hypotheses in which the source projection is a string of 1 word, such as Je and danser. The beam search starts with an hypothesis in the first stack and adds a bi-phrase using the principles outlined above. Depending on the number of words in the added bi-phrase, it may be assigned to the second stack or to a higher stack. Once all the hypotheses in the first stack 52 have been expanded in this way, the search moves to the second stack 54, expanding those hypotheses, and so forth, moving from left to right across the stacks until the final stack 62 is reached. Eventually, one or more of the stacks may reach or exceed its maximum beam size and is culled by eliminating hypotheses which are statistically less favored to bring the number of hypotheses to the maximum permitted by the beam. In addition to limiting the stacks to the maximum beam size, the scoring functions may also compare the scores of the hypotheses in the stack and eliminate hypotheses for which the scores differ from those of other hypotheses by more than a predetermined amount. Translation scoring functions for identifying statistically favored hypotheses are outlined below.

Translation Scoring Functions

The exemplary method for automatically producing translations relies on a translation scoring function, i.e., a mathematical function which, given a SL text $s_1^I$ and a sequence $d_1^K$ of decisions returns a numerical value $Q(s_1^I, d_1^K)$, denoting how "good" the translation obtained by combining together the decisions in $d_1^K$ is for $s_1^I$. Assuming this function is such that larger values denote "better" translations, the exemplary translation method seeks, for a given $s_1^I$, to select the sequence of decisions for which this score is maximized:

$$\hat{d}_1^K = \underset{d_1^K}{argmax} \, Q(s_1^I, d_1^K) \quad (5)$$

As a further requirement, function Q should be cumulative. To this end, an update function q is employed which computes the gain resulting from appending decision $d_{k+1}$ to an existing sequence $d_1^k$ (possibly null) for the translation of $s_1^I$:

$$Q(s_1^I, d_1^{k+1}) = Q(s_1^I, d_1^k) + q(s_1^I, d_1^k, d_{K+1}) \quad (6)$$

In other words, if a given translation $t_1^J$ for $s_1^I$ is obtained by combining the target-language fragments of $d_1^K$ then it must be possible to compute its score as:

$$Q(s_1^I, d_1^K) = \sum_i^K q(s_1^I, d_1^{i-1}, d_i) \quad (7)$$

where $d_1^0 = \epsilon$ (the empty sequence)

Note that, in particular, if Q can be obtained as a sum of individual bi-fragment scores $\Sigma_i$ score(b(di)), then it satisfies the required property.

The translation method may also make use of a "translation completion estimation" function, i.e., a mathematical function $R(s_1^I, d_1^k)$ which, given a sequence of decisions $d_1^k$ which produces a partial translation of $s_1^I$, estimates the maximum score that could be obtained for the remaining untranslated portion of $s_1^I$. In one embodiment, R is an admissible heuristic function, meaning that it should never underestimate this score. In other words, whatever suffix sequence of decisions $d_{k+1} \ldots d_K$ is used to complete the translation, then:

$$Q(s_1^I, d_1^K) \leq Q(s_1^I, d_1^k) + R(s_1^I, d_1^k) \quad (8)$$

or equivalently, using a decomposition such as that of Eq. (7):

$$R(s_1^I, d_1^k) \geq \sum_{i=k+1}^K q(s_1^I, d_1^{i-1}, d_i) \quad (9)$$

Designing such an admissible heuristic function is easy: if R systematically produces a score larger than any that can be produced by Q, then it should never underestimate the potential gain. In practice, "sharper" heuristics (i.e., functions that closely approximate the maximum possible gain) will lead to better and faster translations.

Both the translation scoring and translation completion estimation functions can be composite functions, in the sense that they combine information describing different aspects of the relationship between the source and the target texts. For example, the function Q could combine information coming from two different functions $Q_1$ and $Q_2$, where $Q_1(s_1^I, d_1^K)$ measures to what degree $s_1^I$ and the TL fragments of $d_1^K$ are related in terms of the words they contain, while $Q_2(s_1^I, d_1^K)$ measures relatedness in terms of the SL and TL grammatical structures.

If the feature functions $h_m$ are properly designed, a log-linear statistical translation model such as that previously described may very well satisfy the requirements to be used as a translation scoring function. Because Eq. (2) is formulated as a sum, it obviously follows that if each feature function $h_m$ is itself cumulative, then so is the whole scoring function.

Within the search procedure, the partial translation score Q and the estimated completion score R should be efficiently calculated. Koehn and Och and Ney, referenced above, and others have examined how this may be done with a log-linear model, when translating with contiguous bi-fragments or equivalent structures. The existence of non-contiguous bi-fragments adds complexity to some of these calculations for existing feature functions. Furthermore, update functions and completion estimation functions are designed for the new features introduced, as discussed below.

Bi-Fragment Discontinuity

The bi-fragment discontinuity function $h_{gaps}$ is formulated as a sum over the $d_i$ therefore it follows that it is cumulative. The corresponding update function simply returns the total number of gaps in the last decision.

$$q_{gaps}(s_1^I; d_1^{K-1}, d_K) = \text{gapCount}(b(d_k))$$

To design a corresponding translation completion estimation (heuristic) function $R_{gaps}$ that is admissible, it is helpful to establish what it means to be "optimistic" with regard to this characteristic of a translation. Under the assumption that "contiguity is good", then $R_{gaps}$ would sum, for each uncovered position j in $s_1^I$, the number of source and target gaps in the "less gappy" available bi-fragment that covers position j. In practice, this function can be quite expensive to compute, because each bi-fragment available to translate $s_1^I$ is examined in turn to verify whether or not it is applicable in the current hypothesis (i.e., it covers only word positions in $s_1^I$ that are not already covered by $b_1^k$).

A less precise, but more economical option is to ignore whether a bi-fragment is applicable or not in any given situation, and precompute the best possible yield for each source position once and for all.

In most real-life situations, there will be a one-word-to-one-word bi-fragment to cover any SL position, and the following heuristic will produce an exact value:

$$R_{gaps}(s_1^I, t_1^J, d_1^K) = 0$$

Bi-fragment Reordering

The bi-fragment reordering feature function $h_{reord}$ discussed above is also formulated as a sum over decisions, and is therefore naturally cumulative. It relies on the source coverage vector V' corresponding to the partial translation of the previous hypothesis H'.

$$q_{reord}(s_1^I, d_1^{k-1}, d_k) = \sum_{i=1}^{i}(d_k) - 1I(V_i^I = 0) \quad (10)$$

In other words, for any given partial translation hypothesis H, the update function simply counts the number of zeros to the left of the current source position source($d_k$) in the source coverage vector V'.

As for the corresponding heuristic, assuming that "no reordering is good", and assuming that it is always possible to translate $s_1^I$ monotoneously, i.e.; without reorderings, it is reasonable to assume:

$$R_{reord}(s_1^I, t_1^J, d_1^k) = 0$$

It should be noted that the assumption that it is always possible to translate $s_1^I$ monotoneously is actually not generally true: it depends on the actual bi-fragments available to translate $s_1^I$. In practice, however, it is reasonable to expect to have at least one "one-word-to-one-word" pair of bi-fragments available for each SL position, which is a sufficient condition to ensure that monotone decoding is feasible.

Language Model

One component that is often used in statistical machine translation systems is a N-gram model of the target language, i.e., a component that completely ignores the SL text $s_1^I$ and estimates the probability of observing any given target language sequence of words, based on the individual probabilities of the N-grams (sequences of N words) that it contains. If we have TL sequence $t_1^J$, then:

$$Pr(t_1^J) = Pr(t_1) \times Pr(t_2|t_1) \times Pr(t_3|t_1^2) \times \ldots \times Pr(t_J|t_1^{J-1}) \quad (11)$$

$$\approx \prod_{j=1}^{J} Pr(t_j|t_{j-N+1}^{j-1})$$

where $t_j = §$ (a special "sentence-boundary" word) whenever $j \leq 0$.

When using a log-linear model for translation, it is possible to incorporate a feature function $h_{target}(s_1^I, t_1^J, d_1^K)$ based on such a N-gram model. However, because $t_1^J$ is potentially a partial translation of $s_1^I$ and may contain discontinuities, in the present system, $h_{target}$ only considers those portions of if that constitute complete N-grams, i.e., sequences of N non-gap words (here again, allowing for N−1 initial § symbols). Furthermore, to obtain a feature function with the "cumulative" property, $h_{target}$ computes the logarithm of the probability:

$$h_{target}(s_1^I, t_1^J, d_1^K) = \sum_{j=1}^{J} noGaps(t_{j-N+1}^j)\log(Pr(t_j|t_{j-N+1}^{j-1})) \quad (12)$$

where noGaps($\tilde{t}$) returns 1 if sequence $\tilde{t}$ does not contain any gaps ($\diamond$), 0 otherwise.

The corresponding heuristic function $R_{target}$ then takes into account two different aspects of the situation:
1. Underspecified contexts $c(t_1^J)$: the contribution from words in $t_1^J$ that are not part of complete N-grams, and that was not counted in $h_{target}$ for lack of information;
2. Untranslated source words $u(s_1^I, t_1^J)$: those target words that have not yet been generated, corresponding to the still uncovered portions of the source text $s_1^I$.

To produce optimistic estimates for both of these, the N-gram model is extended to account for gaps in the context. To this end, the notion of optimistic N-gram probability may be introduced:

$$\hat{Pr}(w|x) = \max_{y \in M(h)} Pr(w|y) \quad (13)$$

where M(x) is the set of all sequences of non-gap words that "match" x: $y \in M(x)$ if and only if $|x|=|y|$ and for all i, either $x_i = y_i$ or $y_i = \diamond$. In other words, the context y that matches x, and after which word w is the most likely to occur are sought.

Given such optimistic probability estimates, computing the contribution from underspecified contexts is straightforward:

$$c(t_1^J) = \sum_{j=1}^{J}(1 - noGaps(t_{j-N+1}^j))\log(\hat{Pr}(t_j|t_{j-N+1}^{j-1})) \quad (14)$$

For untranslated source words, the maximum potential contribution from each uncovered source word $s_i$ to the overall probability of the translation of $s_1^I$ is computed. We begin by computing, for each available bi-fragment $b=<\tilde{x},\tilde{y}>$ from the bi-fragment library, the optimal probability of the words of TL fragment $\tilde{y}$, a value which is denoted $$\tau_b: \quad (15)$$

$$\tau_b = \sum_{j=1}^{|\tilde{y}|} noGaps(y_j)\log(\hat{Pr}(y_j|y_{j-N+1}^{j-1}))$$

If bi-fragment b is used in the translation $t_1^J$ of $s_1^I$, then its contribution to the probability of $t_1^J$, as given by the N-gram model, will be at most $\exp(\hat{\tau}_b)$. Dividing $\hat{\tau}_b$ by the number of (non-gap) words in the SL fragment $\tilde{x}$ of b, gives the per-source-word log-contribution of b, a value denoted by $\sigma_b$:

$$\sigma_b = \frac{\tau_b}{words(\tilde{x})}$$

These values can be computed in advance for each bi-fragment b. Now, for each untranslated word $s_i$ in SL input $s_1^I$, it is possible to determine which bi-fragments can potentially cover $s_i$ without interfering with previously used bi-fragments, a set denoted $\beta(i, d_1^K)$. Then, for each bi-fragment in these sets, we can find the one which has the highest value of $\sigma_b$. The optimistic estimate of contributions from untranslated source words is then obtained by summing these values over all untranslated words:

$$u(s_1^I, d_1^k) = \sum_{s_i \text{ not covered by } d_1^k} \max_{b \in \beta(i, b_1^k)} \sigma_b \quad (16)$$

When a large number of bi-fragments is available to translate a given input $s_1^I$, it can be expensive to compute $\beta(i, d_1^k)$. As a time-saving approximation, for each source word $s_i$, precompute $\tilde{\sigma}(s_i)$, the overall maximum contribution of $s_i$, regardless of whether the corresponding bi-fragment is usable or not in the current configuration:

$$\tilde{\sigma}(s_i) = \max_{b \in \beta(i, \epsilon)} \sigma_b \quad (17)$$

Then:

$$u(s_1^I, d_1^k) = \sum_{s_i \text{ not covered by } d_1^k} \tilde{\sigma}(s_i)$$

The heuristic for the target language feature function is just the sum of optimistic estimates for target words in under-specified contexts and untranslated source words:

$$R_{target}(s_1^I, t_1^J, d_1^K) = c(t_1^J) + u(s_1^I, d_1^K) \quad (18)$$

Pruning

In any realistic setting, it is not practicable to consider all possible hypotheses, as the number of hypotheses grows exponentially with the size of the input SL sequence. In one embodiment, hypotheses are pruned in a beam-search manner. The pruning can be applied either globally (uni-stack beam search), or hypotheses can be grouped into several sets and the pruning is applied for each hypotheses set (multi-stack beam search). Typically, hypotheses are grouped according to the number of covered words in the source sentence, so that the hypotheses are more comparable.

The beam width is defined in both the relative score window $W_p$ and the absolute hypotheses count $N_p$. For each stack, hypotheses which ranked below $N_p$ or those whose score difference to the best is greater than $W_p$ may be discarded.

To reduce search errors, hypotheses are compared by the sum of the current score Q and the estimated score R to complete the translation. If the heuristic function for obtaining R is admissible (i.e., the real score is always smaller than or equal to the estimated score) and if only the best hypothesis is extended without pruning, it performs as an optimal A*-search decoder.

Merging Hypotheses

In the course of creating new hypotheses by extending existing ones, pairs of competing hypotheses may become undistinguishable from the decoder's point of view, in the sense that both will be completed in the exact same way. Two such hypotheses may be said to be equivalent. When this happens, there is no point in extending both hypotheses explicitly, and the search space can be reduced by retaining for further extension only the most promising of equivalent hypotheses. In a context where only a single translation to a SL input is sought, then all but one of the equivalent hypotheses can be discarded. If multiple translations are required for a SL input (so-called N-best decoding), then a list of equivalent hypotheses can be retained, while only one, which is referred to as the dominant decision, is extended. In practice, merging amounts to having multiple decisions point to the same hypothesis in the graph, as in the example of FIG. 6, where dominant decisions are represented by full lines, while merged hypotheses are dotted.

It will be appreciated that this sort of hypothesis merging is reasonable only if it is possible to identify equivalent hypotheses in an efficient manner (i.e., without effectively completing the hypotheses). It should also be noted that it is not essential to identify all equivalent hypotheses (total recall). However, the more which are identified, the better.

In general, for two hypotheses to be equivalent, they need to have the same source language coverage: this means that even though the lists of decisions that lead to each hypothesis will be different, the source-language positions that are covered by bi-fragments in these decisions must be the same. For example, given the source-language sentence "Je ne veux plus danser le tango", the two following hypotheses $H_1$ and $H_2$ have identical source-language coverage:

$H_1 = \{[i=1, b=<Je, I>][i=2, b=<\text{ne veux plus, don't want anymore}>]\}$ $H_2 = \{[i=1, b=<Je \diamond \text{veux}, I \diamond \text{want}>][i=2, b=<\text{ne} \diamond \text{plus, don't} \diamond \diamond \diamond \text{anymore}>]\}$ In both cases, the four initial word positions are covered: "Je ne veux plus".

Given the current search procedure, for two hypotheses to be completed in the same way, they should also have identical target-language tails $\mu$, where tail means the segment of text starting at the leftmost gap and extending to the right end of the string. In the example above, the two target sequences are:

$t(H_1)$=I don't want anymore $t(H_2)$=I don't want $\diamond \diamond$ anymore and the corresponding tails:

$\mu(H_1) = \epsilon$ $\mu(H_2) = \diamond \diamond$ anymore

Here, $H_1$ and $H_2$ would not be equivalent, because they have different tails. However $H_3 = \{[i=1, b=<Je, I>][i=2, b=<\text{ne veux plus, do not want} \diamond \diamond \text{anymore}>]\}$ would be equivalent to $H_2$, because both have identical tails "$\diamond \diamond$ anymore" (even though they have different translations: $t(H_2) \neq t(H_3)$).

Additional merging criteria may be imposed by the nature of the translation scoring function used. In particular, if the translation model outlined above is used with a N-gram language model, then the completion of any given hypothesis will depend on the n−1 words preceding the tail, because these words will affect the contribution to the language model of the words inserted at the beginning of the tail. Therefore, if an N-gram model is used, one can not assume two hypotheses to be equivalent if their n−1 words before the tail, what we call the language model state, are different.

For example, under this new criteria, and using a trigram model, hypotheses $H_2$ and $H_3$ would not be equivalent, because they have different language model states:

$\omega(H_2)$=don't want $\omega(H_3)$=_not want

Implementation Issues

In practice, a hypothesis H may be implemented as a data structure, with the following fields:

$V_s$ is the source coverage vector;

$V_t$ is the analog of $V_s$, but for the (possibly partial) translation t(H). Note that if t(H) contains gaps, then the corresponding positions in the coverage vector are equal to zero;

Q is the accumulated score of all previous decisions;

H' is a backpointer to the best previous hypothesis d is the last decision d=[b,i] leading to H from H' m is a list of merged hypotheses (required only for N-best decoding)

The data structure for the stack(s) should be carefully designed, so as to allow fast access and operations based on the score and the merging criteria. One of the simplest implementations is to use a vector, sorted by score; in this case, score-based access is fast, but the merging procedure needs to scan all the entries to find a merge candidate for a new hypothesis. Alternatively, stacks can be implemented using binary heaps indexed by scores, allowing rapid insertions and access to the best-scoring hypothesis; each hypothesis H could have an additional field $\omega$ that contains all the information necessary to verify equivalence (e.g., the coverage vector $V_s$ and some suffix of the TL sequence); and an auxiliary hash-table could be used to index hypotheses by values of $\omega$.

The garbage collection of hypothesis H should be taken care of, so as to get rid of hypotheses which are not referenced anymore, either directly in the graph, or as merged hypotheses. As an example implementation, each H is given a reference counter, which is incremented when H is extended. Whenever a hypothesis is removed from the stack as a result of pruning, the counter is decremented, and the actual memory deallocation occurs when it reaches to zero, at which time, the previous hypotheses are also marked for deletion.

The above-described translation method has advantages over conventional translation systems, which may be realized singly or in combination. In one aspect, it has the ability to make use of non-contiguous fragments of source and target language text. In another aspect, it includes components within a statistical translation model to model fragment discontinuity. In yet another aspect, it includes procedures for efficiently computing the potential of partial translations with discontinuities with regard to the statistical model. In yet another aspect, a search mechanism allows translation of text in almost-constant time.

EXAMPLE

A prototype of the machine translation method described above was implemented. Libraries comprising contiguous and non-contiguous bi-phrases were developed and evaluated on samples of text. This has allowed the feasibility of the approach to be demonstrated. Furthermore, experiments have been conducted, to assess the impact of using non-continuous fragments in translation. These experiments have shown that this method allows for improved translation quality. The details of these experiments and results are described in Simard.

The results demonstrated that adding non-contiguous bi-phrases can be fruitful in phrase-based statistical machine translation. The results suggest that concentrating on bi-phrases with 3 gaps or less was found to afford a good compromise for providing improved translation while allowing control of exponential growth of the libraries. The results suggest that constructing increasingly large bi-phrases does not necessarily lead to better translations. Some of the best results were obtained with relatively small libraries (just over 200,000 entries) of short bi-phrases. Thus, it is suggested that selecting the most useful bi-phrases (in terms of the frequency of their occurrence) for a library may prove more valuable than simply increasing the number of bi-phrases in the library.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A machine translation method for translating source text from a first language to target text in a second language, comprising:

receiving the source text in the first language;

accessing a library of bi-fragments stored in computer memory, each of the bi-fragments including a text fragment from the first language and a text fragment from the second language, at least some of the bi-fragments comprising non-contiguous bi-fragments in which at least one of the text fragment from the first language and the text fragment from the second language comprises a non-contiguous fragment; and retrieving text fragments from the second language from the library corresponding to text fragments in the source text, including retrieving a non-contiguous bi-fragment for a text fragment in the first language for which the library includes a non-contiguous bi-fragment;

generating at least one target hypothesis, each of said target hypotheses comprising text fragments selected from the second language; and evaluating the hypothesis with a translation scoring function, the translation scoring function comprising at least one feature function which accounts for non-contiguous text fragments.

2. The method of claim 1, wherein the generation of the target hypothesis includes expanding an existing hypothesis, and where the existing hypothesis includes at least one non-contiguous bi-fragment which includes at least one gap, adding a text fragment to the existing hypothesis which covers at least one of the at least one gaps in the existing hypothesis.

3. The method of claim 1, wherein the generating of a target hypothesis includes performing a multiple stack beam-search.

4. The method of claim 1, wherein each word in the text is assigned a source position and wherein a hypothesis which would result in two bi-fragments covering the same source position in the first language is rejected.

5. The method of claim 1, wherein the feature function comprises at least one of:

a first feature function which models bi-fragment discontinuities within known translations; and a second feature function models bi-fragment reorderings whereby statistically probable reorderings are favored over improbable ones.

6. The method of claim 5, wherein the feature function models bi-fragment discontinuities by counting the number of gaps within the source and target fragments that make up the translation hypothesis.

7. The method of claim 1, wherein each non-contiguous bi-fragment in the library includes at least one gap in at least one of the text fragment from the first language and the text fragment from the second language.

8. The method of claim 7, further including, rejecting a target hypothesis which includes a gap and wherein there is no bi-fragment in the library which includes a contiguous or non-contiguous text fragment in the second language corresponding to the text fragment from the first language which covers the gap.

9. The machine translation method of claim 1, further comprising:
generating the library of bi-fragments including storing non-contiguous bi-fragments in memory.

10. The machine translation method of claim 1, wherein the at least one target hypothesis is a partial hypothesis which covers fewer than all words in the source text.

11. A machine translation method for translating source text from a first language to target text in a second language, comprising:
receiving the source text in the first language;
accessing a library of bi-fragments, each of the bi-fragments including a text fragment from the first language and a text fragment from the second language, at least some of the bi-fragments comprising non-contiguous bi-fragments in which at least one of the text fragment from the first language and the text fragment from the second language comprises a non-contiguous fragment;
with a computer processing component, retrieving text fragments from the second language from the library corresponding to text fragments in the source text, including retrieving a non-contiguous bi-fragment for a text fragment in the first language for which the library includes a non-contiguous bi-fragment; and
generating at least one target hypothesis, each of said target hypotheses comprising text fragments selected from the second language, wherein a hypothesis which positions a word in the second language in the same position as a word already there is rejected.

12. A machine translation system comprising:
a memory which stores a library of bi-fragments, each of the bi-fragments including a source text fragment from a first language and a corresponding target text fragment from the second language, at least some of the bi-fragments in the library comprising non-contiguous bi-fragments; and
a processing component which receives text comprising source text fragments selected from the first language and accesses the memory to retrieve stored text fragments from the second language including non-contiguous bi-fragments, the processing component comprising a translation scoring function which includes at least one of:
a first feature function which evaluates bi-fragment discontinuities; and
a second feature function which evaluates bi-fragment reorderings.

13. The machine translation system of claim 12, wherein the processing component further comprises:
instructions for generating at least one target hypothesis, each of said target hypotheses comprising text fragments selected from the second language; and
instructions for evaluating the hypothesis with a translation scoring function.

14. The machine translation system of claim 13, wherein the first feature function counts gaps in the target text of the hypothesis and corresponding source text.

15. The machine translation system of claim 13, wherein the second feature function measures a difference in order between source and target fragments by summing over each bi-fragment used to translate the source text, a number of words from the first language which are positioned to the left of the source fragment in the bi-fragment, which are translated by corresponding words in the target text that begin to the right of the target fragment in the bi-fragment.

16. The machine translation system of claim 12, wherein the translation scoring function combines the outputs of first and second scoring functions to provide a score and wherein the processing component prunes hypotheses based on their scores.

17. The machine translation system of claim 12, wherein the non-contiguous bi-fragments each include at least one of a non-contiguous source text fragment and a non-contiguous target text fragment.

18. The machine translation system of claim 12, wherein the library associates each of a plurality of non-contiguous bi-fragments with a corresponding maximum gap in at least one of the source text fragment and the target text fragment.

19. An article of manufacture comprising a program storage medium readable by a computer comprising:
a processing component which translates source text comprising source text fragments selected from a first language and outputs at least one hypothesis comprising target text fragments selected from a second language, the processing component configured for accessing an associated memory to retrieve stored text fragments from the second language, the memory storing bi-fragments comprising a text fragment in the first language and a corresponding text fragment in the second language, the processing component including a scoring function which comprises:
a first feature function which evaluates bi-fragment discontinuities, and
a second feature function which evaluates bi-fragment reorderings,
whereby a hypothesis which includes a non-contiguous fragment in at least one of the first language and the second language is scored.

20. A machine translation method comprising:
storing a library of bi-fragments, each of the bi-fragments including a source text fragment from a first language and a corresponding target text fragment from the second language, at least some of the bi-fragments in the library comprising non-contiguous bi-fragments;
receiving text comprising source text fragments selected from the first language;
retrieving stored text fragments from the second language including non-contiguous bi-fragments;
generating at least one target hypothesis, each of said target hypotheses comprising text fragments selected from the second language; and
with a computer processing component, applying a translation scoring function which includes at least one of:
a first feature function which evaluates bi-fragment discontinuities; and
a second feature function which evaluates bi-fragment reorderings.

* * * * *